May 19, 1959 R. P. SKERRITT 2,887,102
BALANCED PAN HUMIDIFIER
Filed Dec. 29, 1955 3 Sheets-Sheet 1
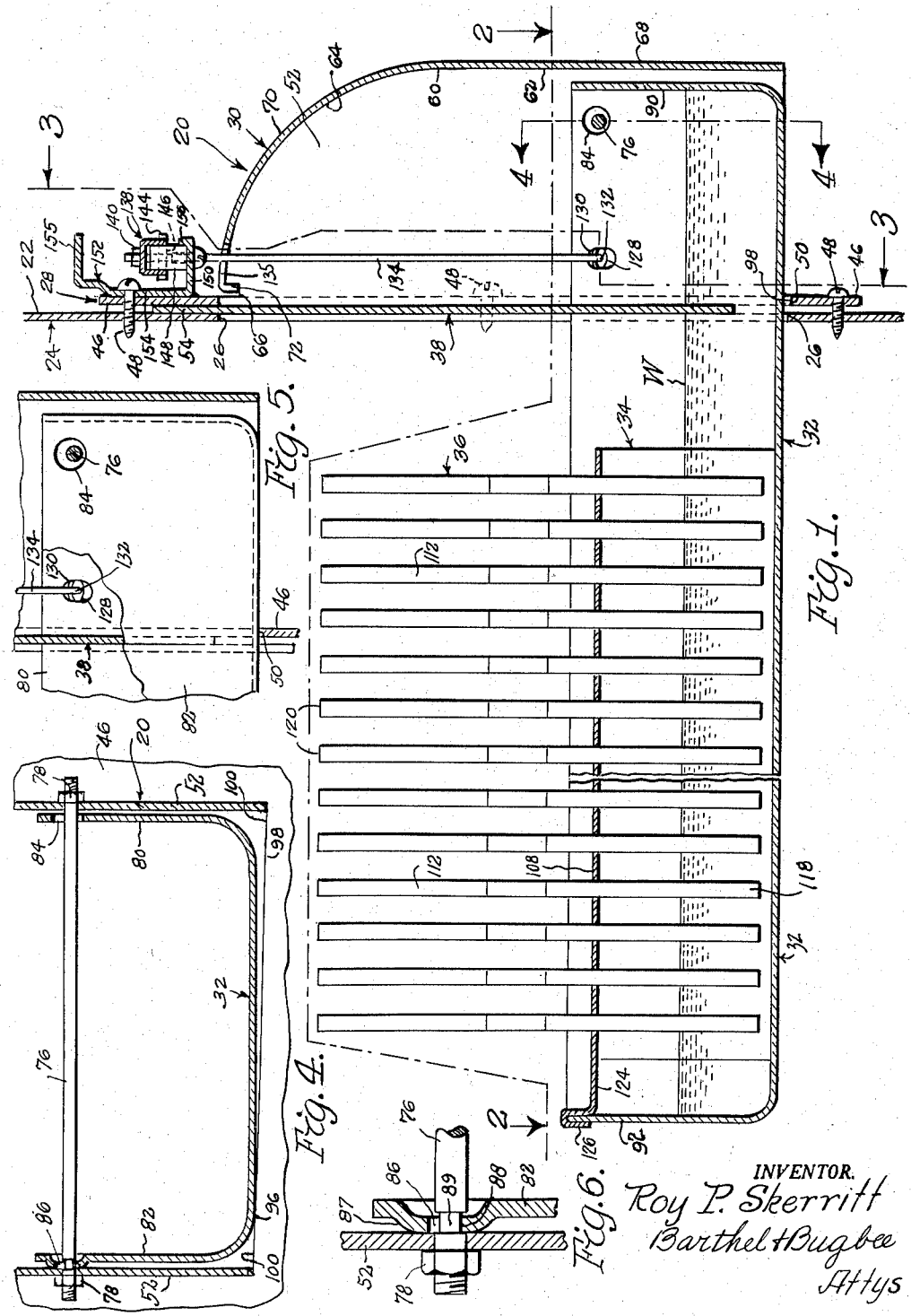
INVENTOR.
Roy P. Skerritt
Barthel & Bugbee
Attys

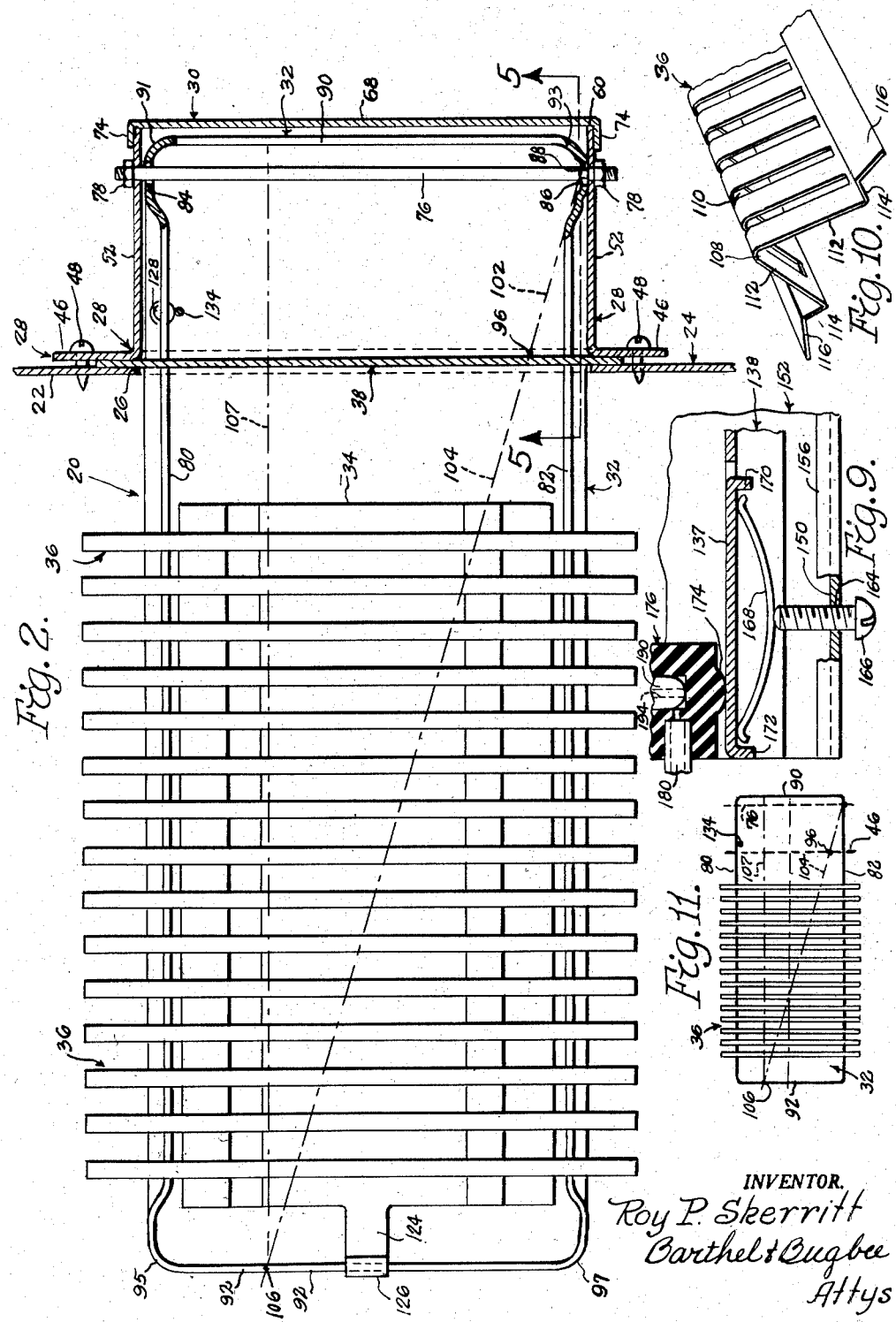

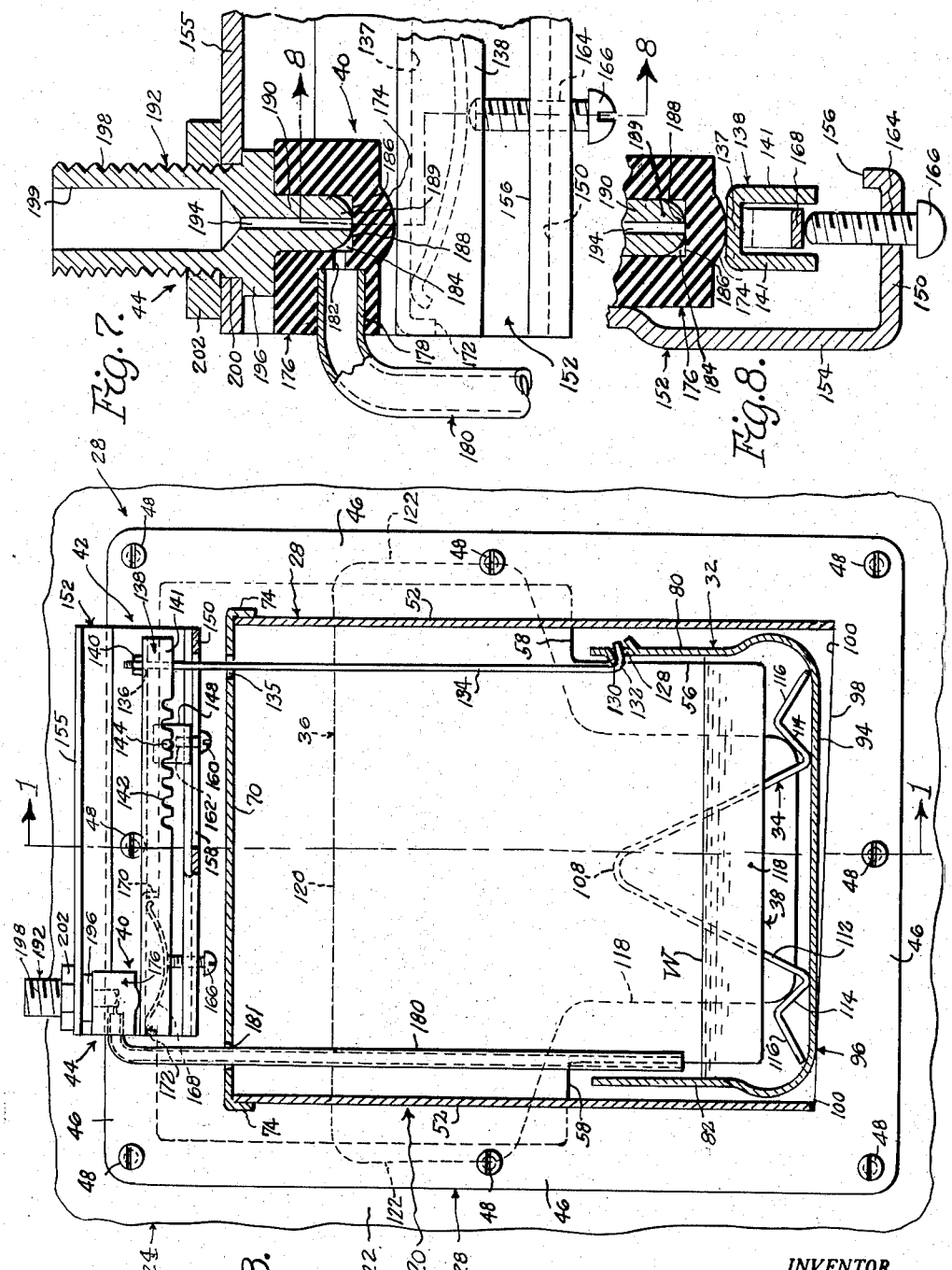

United States Patent Office 2,887,102
Patented May 19, 1959

2,887,102
BALANCED PAN HUMIDIFIER
Roy P. Skerritt, Detroit, Mich.

Application December 29, 1955, Serial No. 556,167

11 Claims. (Cl. 126—113)

This invention relates to humidifiers and, in particular to balanced pan humidifiers for heating systems.

One object of this invention is to provide a balanced pan humidifier in which evaporator plates may be mounted for increasing the evaporating efficiency thereof, yet wherein the weights of the evaporator plates almost balance themselves, with a slight preponderance of weight remaining for operating the flow valve.

Another object is to provide a balanced pan humidifier of the foregoing character wherein the weight of the pan and the water therein is almost balanced on opposite sides of an oblique line or axis of tilt, also with a slight preponderance of weight remaining in order to operate the flow valve.

Another object is to provide a balanced pan humidifier of the foregoing character wherein the unbalanced weight of the pan and its contents is transmitted to the flow valve to close the flow valve when the depth of water in the pan has reached a desired amount, yet where the overbalancing force is capable of being reduced to only a few ounces and consequently enables the use of a flow nipple with a desirably small orifice in order to prevent the spurting and spray of water resulting from the use of a large orifice therein, as hitherto required.

Another object is to provide a balanced pan humidifier of the foregoing character wherein a large number of evaporator plates can be mounted in and supported by the pan itself rather than requiring them to be suspended from an independently-supported bracket, as hitherto, thereby enabling the use of a much larger number of evaporator plates in the pan than has hitherto been possible to insert and use in independently-suspended evaporator plate installations, consequently increasing the evaporating efficiency and capacity of the installation to a point far above that possible in prior installations where the number of evoprator plates insertable therein was limited to only a few such plates.

Another object is to provide a balanced pan humidifier of the foregoing character wherein the pan rocks on an axis of tilt which is oblique to the longitudinal center line of the evaporator pan, resulting in a near balance of the weights of the pan, evaporator plates and water on opposite sides of this oblique axis of tilt and leaving only a few ounces of unbalanced weight which is utilized for operating the flow valve sensitively and with a small orifice in the flow nipple thereof.

Another object is to provide a flow valve for a humidifier wherein the flow of the water is regulated by the action of a resilient wall of elastic deformable material, such as natural or synthetic rubber or plastic, against the valve seat surrounding the orifice in the end of the flow nipple, thereby enabling the resilient wall to shape itself around any and seal any so-called "wire drawing" or grooving of the valve seat developed adjacent the flow nipple outlet as the result of the flow of water therethrough over a long period of time and previously causing undesired leakage of water.

Another object is to provide a flow valve, as set forth in the object immediately preceding, wherein the resilient wall is located at the bottom of a cup-shaped member which is snugly fitted over the flow nipple so as to substantially isolate it from air and consequently prevent the oxidation and resultant deterioration of the valve nipple by the action of such air and hot water upon the valve nipple, an outlet being provided near the valve nipple orifice, the resilient wall being pushed against the valve seat with an increasing force in response to the rise of the water level in the pan or other receptacle in which the valve regulates the water level.

Another object is to provide a flow valve, as set forth in the two objects immediately preceding, wherein there is provided an adjustment screw, preferably assisted by a spring, for applying such force as is adapted to exert an adjustable pressure against the resilient wall of the flow valve, thereby at the start of operation preventing the great surge of water into the empty pan and consequent splashing of water over the nearby parts of the valve mechanism and mounting bracket, and hence preventing the corrosion previously resulting therefrom; this construction also enabling the installation to be instantly adjusted to and compensated for widely varying local water pressures.

Other objects and advantages of the invention will become apparent during the course of the following description of the accompanying drawings, wherein:

Figure 1 is a central longitudinal section through a balanced pan humidifier, according to one form of the invention, taken along the line 1—1 in Figure 3;

Figure 2 is a top plan view, partly in horizontal section, of the humidifier shown in Figure 1, taken along the line 2—2 therein;

Figure 3 is a vertical cross-section taken along the line 3—3 in Figure 1;

Figure 4 is a fragmentary cross-section through the evaporator pan and mounting bracket, taken along the line 4—4 in Figure 1;

Figure 5 is a fragmentary vertical section, taken along the line 5—5 in Figure 2, with the evaporator pan mainly in side elevation;

Figure 6 is an enlarged fragmentary cross-section constituting an enlarged view of the upper left-hand corner of Figure 4, showing the fulcrum action of one side of the evaporator pan against the tie rod extending between the mounting bracket wings;

Figure 7 is an enlarged fragmentary vertical cross-section through the center line of the flow valve and the adjacent end of the operating lever thereof shown in front elevation in the upper left-hand corner of Figure 3;

Figure 8 is an enlarged fragmentary cross-section taken along the line 8—8 in Figure 7;

Figure 9 is a fragmentary cross-section similar to the lower portion of Figure 7, but with the valve-operating lever shown in section so as to disclose the leaf spring and adjusting screw thereof in side elevation;

Figure 10 is a fragmentary perspective view of an end portion of the evaporator plate rack shown in top plan view in Figure 2; and Figure 11 is a diagrammatic view, mainly in top plan view, illustrating the action of the evaporator pan in tilting along its oblique axis of tilt.

Referring to the drawing in detail, Figures 1 to 3 inclusive show a balanced pan humidifier, generally designated 20, as applied to the front panel, plate or wall 22 of a heating furnace, generally designated 24, and extending through an approximately rectangular opening 26 therein. The balanced pan humidifier installation 20 consists generally of a mounting bracket 28 secured to the furnace wall 22, a curved cover plate 30 therefor, a tiltable evaporator pan 32 tiltably mounted on the mounting bracket 28, an evaporator plate rack 34 mounted in and supported by the evaporator pan 32, multiple evaporator plates 36 supported in spaced parallel relationship by the plate rack 34, a partition plate 38 installed in and covering the major part of the opening 26 in the furnace wall 22, and a flow valve unit 40 including a valve operating device 42 and a flow valve 44 operated by the operating device 42.

The mounting bracket 28 (Figures 2 and 3) consists of a mounting border portion 46 of approximately rectangular outline secured by screws 48 or other fasteners to the furnace wall 22 surrounding the opening 26 and having an approximately rectangular opening 50 therein formed by spaced parallel wings 52 stamped therefrom and bent into spaced parallel relationship with one another. The partition plate 38 is inserted between the border portion 46 and the furnace wall 22 and covers most of the opening 26 except for the extreme lower portion thereof. The partition plate 38 has a broader upper portion 54 which covers the upper part of the furnace wall opening 26, and a narrower lower portion 56 extending from the shoulders 58 at the junction with the wider portion 54 downward into the evaporator pan 32 (Figure 3).

The wings 52 of the mounting bracket 28 have forward edges 60, the lower portions 62 of which are straight and the upper portions 64 of which are curved and likewise have notches 66 adjacent their junction with the border portion 46. The cover 30 has a flat front portion 68 and curved upper portion 70 accurately fitting the straight and curved edge portions 62 and 64 of the wings 52, and likewise has a vertical flange 72 at its upper forward end (Figure 1) adapted to enter the notches 66. The cover 30 also has side flanges 74 overlapping the wings 52 to substantially completely enclose the space between the wings 52 and the cover 30. A tie rod 76 extends between the wings 52, which are suitably drilled for that purpose, and has its opposite ends threaded to receive nuts 78. The side walls 80 and 82 respectively of the evaporator pan 32 are drilled as at 84 and 86 with oversized holes through which the tie rod 76 passes, the hole 86 being located in an outward bulge 87 of the side wall 82. The above arrangement is such that the edges of the hole 84 remain free from contact with the tie rod 76 during operation of the humidifier, whereas the lower edge 88 of the hole 86 engages a reduced diameter portion 89 of the tie rod 76 (Figures 4 and 6) as a fulcrum during operation of the humidifier. The front wall 90 of the humidifier pan 32 is spaced away from the cover 30 (Figure 1) and the rear wall 92 thereof is disposed within the interior of the furnace 24. For purposes of reference in connection with the operation of the invention, the corners of the pan 32 at the upper edge thereof are designated 91, 93, 95 and 97 (Figure 2).

The bottom wall 94 of the pan 32 has a rolling or variable point of contact 96 with the lower edge 98 of the opening 100 in the mounting bracket 28 (Figure 3) as the evaporator pan 32 tilts about its fulcrum 88 during operation of the humidifier. Thus, as will be seen in connection with the operation of the invention, the humidifier pan 32 tilts around an oblique or skew axis 102 extending from the fulcrum 88 to the contact point 96, a vertical plane 104 through the points 88 and 96 intersecting the rear wall 92 of the humidifier pan 32 at a point 106 approximately one-third of the width of the humidifier pan 32 (Figures 2 and 11), as indicated by the line 107 drawn from the intersection point 106 parallel to the longitudinal axis of the pan 32.

The evaporator plates 36 are used to increase the evaporating capacity of the humidifier 20, and for that purpose are constructed of absorptive or porous material, such as porous ceramic material or fibrous glass, having a capillary action upon the water in the pan 32 so as to raise it from the pan 32 to the upper portions of the plates 36 whence it is carried into the air stream by the air-circulating system of the furnace, whether by convection or by forced circulation. The rack 34 upon which the evaporator plates 36 are suspended (Figures 1, 2, 3 and 10) consists of a sheet of metal or other suitable material bent into a shape having an approximately inverted V-shaped central portion 108 with spaced slots 110 extending downwardly along both sides 112 thereof for receiving the evaporator plates 36. The sides 112 of the inverted V-shaped portion 108 terminate in upwardly-bent flanges 114 which in turn terminate in downwardly-bent flanges 116 (Figure 10), the flanges 114 and 116 being inclined relatively to one another and to the inclined portion 112 of the inverted V-shaped rack-supporting portion 108 and resting upon the bottom wall 94 of the evaporator pan 32 (Figure 3). The evaporator plates 36 have relatively narrow lower portions 118 which rest partly on the bottoms of the slots 110 and partly upon the inclined inner flanges 114 while the broader upper portions 120 provide wings 122 which project laterally outward beyond the side walls 80 and 82 of the evaporator pan 32, so as to be exposed to the currents of heated air passing upward or downward, as the case may be. The rack 34 has a tongue 124 (Figure 2) terminating in an inverted hook portion 126 which is hooked over the upper edge of the rearward wall 92 of the evaporator pan 32 in order to prevent accidental shifting of the evaporator plate rack 34.

The pan side wall 80 obliquely across the evaporator pan 32 from the fulcrum point 88 of the side wall 82 on the tie rod 76 is provided with a hole 128 with an indented upper edge 130, both of which are pivotally engaged by the bent lower end 132 of a motion-transmitting rod 134. The threaded upper end of the rod 134 passes through holes 135 and 136 respectively in the cover 30 and the rearward end portion of the web 137 of an inverted channel-shaped valve-operating lever 138, and is adjustably connected thereto by a nut 140 (Figure 3) threaded on the upper end of the rod 134. The opposite lower edges of the flanges 141 of the lever 138 are provided with longitudinally-spaced notches 142 which receive the opposite ends of a fulcrum pin or pivot pin 144 mounted in a transverse hole 146 in a fulcrum block 148. The fulcrum block 148 is adjustably supported upon the lower flange 150 of a channel-shaped valve-supporting bracket 152, the web 154 of which is welded or otherwise secured to the border 46 of the mounting bracket 28. The valve-supporting bracket 152 is provided with an upper flange 155 and its lower flange 150 is provided with an upstanding ridge 156 against which the fulcrum block 148 rests and receives guidance. The flange 150 is also provided with an elongated slot 158 which receives a clamping screw 160 which is threaded into a vertical hole 162 in the fulcrum block 148. As a consequence of this construction, the fulcrum block 148 may be moved lengthwise along the bracket 152 and the fulcrum pin 144 is caused to engage any desired notch 142 in the valve-operating lever 138.

The opposite end portion of the bracket 152 from the slot 158 is provided with a threaded hole 164 (Figure 8) through which is threaded an adjusting and stabilizing screw 166 which, as is seen below from the description of the operation, serves to adjust the humidifier installation 20 to different water pressure encountered in different localities. The upper end of the stabilizing screw 166 engages the center of a bow-shaped leaf spring 168 (Figure 9), the opposite ends of which are retained in position against the under side of the web 137 of the valve-operating lever 138 by a pair of longitudinally-spaced lugs 170 and 172 struck downward from the web 137 but spaced slightly farther apart than the distance between the ends of the spring 168 in order to permit adequate range of flexing thereof (Figure 3) in their response to the tightening of the screws 166.

The upper surface of the web 137 of the valve-operating lever 138 near its outer or forward end engages a protuberance 174 (Figures 7 and 8) on a cup-shaped valve closure member 176 of elastic deformable material, such as natural or synthetic rubber or plastic. The valve closure member 176 has in one side thereof a horizontal counterbore 178 slightly smaller in diameter than the upper end of an L-shaped water discharge tube 180 which is interted therein and held by a squeeze fit. The tube 180 extends downward through a hole 181 in the cover 30 to the interior of the pan 32. From the counterbore 178, a bore or port 182 leads into a socket or cup-shaped depression 184 having a bottom wall 186 which engages a valve seat 188 at the rounded lower end 189 of the nozzle 190 of a valve nipple, generally designated 192, around the mouth of a bore or passageway 194 therein. The valve nozzle 190 of the valve nipple 192 is made with a slightly greater diameter than the socket 184 so as to engage the latter with a squeeze fit.

The valve nipple 192 is preferably machined from square stock with the nozzle 190 extending downward from an intermediate portion 196 of square cross-section and a reduced diameter threaded portion 198 with a counterbore 199 extending upward therefrom. The intermediate portion 196 of square cross-section is of such size and the hole 200 in the upper flange 155 of the bracket 152 through which its threaded portion 198 passes is so located that the rearward side of the intermediate portion 196 of the valve nipple 192 flatly engages the web 154 of the valve supporting bracket 152 so as to prevent rotation of the valve nipple 192 when its retaining nut 202 is threaded downward upon its threaded portion 198 into engagement with the upper flange 155 of the bracket 152. The valve socket 184 is of such depth as to be substantially equal to the length of the nozzle portion 190 of the valve nipple 192, with the result that the resilience of the bottom wall 188 and protuberance 174 of the valve closure member 176 effectively close the valve seat 188 at the lower end 189 of the valve nipple 190 together with the lower end or mouth of the water passageway 194 through the nozzle 190. The upper side of the valve member 176 has sealing engagement with the lower side of the intermediate portion 196 of the valve nipple 190 (Figure 7). The port 182 in the valve closure member 176 is located slightly above the level of the bottom or closure wall 188 thereof so as to prevent interference with the flatness of its closure surface.

In the operation of the invention, let it be assumed that the humidifier installation 20 has been mounted in the furnace 24 in the manner shown in Figures 1, 2 and 3, and that evaporator plates 36 have been placed in the slots 110 of the evaporator plate rack 34. Let it also be assumed that the pan 32 is empty and that the weight of it is so distributed that the left-hand rear corner 97 thereof is in its lowered position and the forward right-hand corner 91 in its raised position relatively to the axis of tilt 102. Let it also be assumed that the threaded portion 198 of the valve nipple 192 has been connected to a water pipe containing water under pressure, such as, for example, an ordinary household cold water pipe.

When the water is turned on and flows under pressure into the counterbore 199 of the valve nipple 192 (Figures 3, 7 and 8), it acts against the bottom wall 186 of the resilient valve closure 176 and pushes the latter slightly downward by reason of the resilience thereof, separating the bottom wall 186 from its sealing engagement with the valve seat 188, permitting water to flow into the cup-shaped recess or socket 184 and thence through the port 182, through the discharge pipe 180 downward into the evaporator pan 32. As the water level rises in the evaporator pan 32, because of the fact that the portion of the pan 32 between the dotted line 107 and the pan side 80 is unbalanced, the preponderance of weight of the water filling this space between the line 107 and the pan side walls 80 gradually causes the pan 32 to tilt around its axis 102 from the fulcrum 88 (Figures 3, 4 and 6) to the contact point 96 and the continuation 104 thereof, so that the rearward left-hand corner 97 of the pan 32 rises and the right-hand corner 91 thereof descends. At the same time, however, the bottom wall 94 tilts relatively to the bottom edge 98 of the mounting frame border opening 100 (Figure 3), so that the point of contact 96 therebetween shifts toward the right in Figure 3 as the pan 32 tilts in the manner just described. While this tilting is occurring, and the point of contact 96 is moving to the right in Figure 3, the rearward corners 97 and 95 move slightly to the right, viewed from above (Figure 2).

It will be seen from Figure 2, moreover, that the approximate fulcrum line or tilting line 104 of the evaporator pan passes obliquely through the evaporator plates 36 so that most of them counterbalance one another. In the particular example shown in Figure 2, assuming the fifteen evaporator plates 36 to be in the positions shown in Figure 2, the first twelve plates 36 from the left will counterbalance one another since the distance from the left-hand edge of the rearmost evaporator plate 36 to its intersection with the line 104 is equal approximately to the distance from the right-hand edge of the twelfth evaporator plate 36, counting from the rearward end of the pan 32, to its intersection with the line 104. The three foremost evaporator plates 36 in Figure 2, however, are not correspondingly counterbalanced since their right-hand ends, viewed from the front of the humidifier, are located farther from the intersection of the line 104 with each of these foremost plates than is the left-hand end of any of the rearmost plates 32.

As the forward right-hand corner 91 of the humidifier pan 32 tilts downward under the rising level of water therein, this downward motion is transmitted by the indentation 130 of the hole 128 (Figure 3) to the motion-transmitting rod 134, rocking the lever 138 clockwise around the pivot pin 144 of the pivot block 148 and causing the left-hand end thereof to press upward against the protuberance 174 on the bottom wall 186 of the valve closure member 176, closing off the valve seat 188 and the mouth of the passageway 194 of the valve nipple 192. This action halts the flow of water through the port 182 into the discharge pipe 180, and consequently terminates temporarily the flow of water into the evaporator pan 32.

When, however, water has been evaporated from the evaporator plates 36 and, to a lesser extent, from the evaporator pan 32, the latter tilts backward in the reverse direction around its tilting axis 102 and the continuation 104 thereof, permitting the motion-transmitting rod 134 to move upward along with the forward right-hand corner 91, permitting the valve operating lever 138 to be rocked counterclockwise around the fulcrum pin 144 by the pressure of the water in the counterbore 199 and bore 194 against the bottom wall 186 of the valve closure member 176, re-opening the gap between them so as again to permit flow of water from the passageway 194 into the recess 184 and thence through the port 182 through the discharge pipe 180 into the evaporator pan 32. This action is repeated alternately as the evaporation depletes the supply of water in the evaporator pan 32 and the opening of the flow valve 44 by the valve-operating device 42 consisting of the lever 138, fulcrum block 148, motion-transmitting rod 134 and their associated parts, replenishes the water.

In order to adapt the installation to the varying water pressures existing in different parts of the country, as well as to the placing of different numbers of evaporator plates 36 on the rack 34 in the pan 32, two adjustments are provided in the valve-operating device 42 of the valve unit 40, a major adjustment or a coarse adjustment is provided by shifting the fulcrum block 148 lengthwise along the lower flange 150 of the valve-supporting bracket 152 so as to position the fulcrum pin 144 in different notches 142 of the flanges 141 of the valve-operating lever 138. This is done by loosening the locking screw 160 and sliding the fulcrum block 148 lengthwise of the valve supporting bracket 152, re-tightening the screw 160 in the slot 158 when the desired position has been reached. The fine adjustment to different water pressures is provided by applying a screw driver to the stabilizing screw 166 so as to tension the arcuate spring 168 against the outer end of the web 137 of the valve-operating lever 138 (Figures 3, 7 and 8). Certain mountainous communities, for example, require higher pressures in the domestic water mains in order to carry the water upward to highly situated houses than is necessary in communities situated in level country. The stabilizing screw 166 provides this adjustment for that purpose.

During all of this operation, the edges of the hole 84 in the right-hand side wall 80 of the evaporator pan 32 remain out of contact with the tie rod 76 (Figure 4), whereas the lower edge 88 of the hole 86 in the left-hand side wall 82 thereof remains constantly in contact with the tie rod 76 (Figure 6), thereby serving as a fulcrum around which the evaporator pan 32 tilts. The nut 140 on the valve-operating rod 134 is adjusted on the latter to such a position that the edge of the hole 84 remains out of contact with the tie rod 76.

By reason of the fact that the present invention enables the comparatively heavy weights of the evaporator plates 36, pan 32, rack 34, and water W to counterbalance themselves on opposite sides of the tilting axis 102, 104, as explained above, a preponderating force of only a few ounces may thus be provided to operate the valve operating device 42. Thus, the bore 194 in the valve nipple 192 may be of much smaller diameter than in prior balanced-pan humidifiers, with the result that much of the spurting and splashing resulting from the use of valve nipples with large valve bores can be eliminated, and with it the consequent damage by corrosion, electrolysis and lime deposit on the heated metal parts of the humidifier. Such large-bore valve nipples were required in prior balanced-pan humidifiers where the operating force, instead of being of the order of a few ounces as in the present invention, was of the order of several pounds, and required the use of a large-diameter bore in the valve nipple to enable the water pressure to exert a sufficient counteracting force to open the valve and refill the pan. Moreover, the fact that the pan has the rolling point of contact 96 on the lower edge 98 of the border opening 100 in the mounting bracket 28, relieves the fulcrum 88 and tie rod 76 of much of the weight which would otherwise be exerted upon the fulcrum 88.

What I claim is:

1. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, and motion-transmitting mechanism extending from a point on said pan spaced apart from said pivot axis to said valve member, said pan being so disposed relatively to said pivot axis that the weight of the pan and the water therein almost balance on opposite sides of said pivot axis yet leave a slight preponderance of weight on one side of said pivot axis sufficient to actuate said motion-transmitting mechanism to operate said valve.

2. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, and motion-transmitting mechanism extending from a point on said pan spaced apart from said pivot axis to said valve member, said pan being so disposed relatively to said pivot axis that the weight of the pan and the water therein almost balance on opposite sides of said pivot axis yet leave a slight preponderance of weight on one side of said pivot axis sufficient to actuate said motion-transmitting mechanism to operate said valve, said fulcrum means including a main fulcrum element pivotally supporting one portion of said pan at a first location near the front of said pan, and an auxiliary fulcrum element spaced away from said main fulcrum element and pivotally supporting another portion of said pan at a second location spaced rearwardly from said first location.

3. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, and motion-transmitting mechanism extending from a point on said pan spaced apart from said pivot axis to said valve member, said pan being so disposed relatively to said pivot axis that the weight of the pan and the water therein almost balance on opposite sides of said pivot axis yet leave a slight preponderance of weight on one side of said pivot axis sufficient to actuate said motion-transmitting mechanism to operate said valve, said fulcrum means including a main fulcrum element pivotally supporting one portion of said pan at a first location near the front of said pan, and an auxiliary fulcrum element spaced away from said main fulcrum element and pivotally supporting another portion of said pan at a second location spaced rearwardly and downwardly from said first location.

4. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, and motion-transmitting mechanism extending from a point on said pan spaced apart from said pivot axis to said valve member, said pan being so disposed relatively to said pivot axis that the weight of the pan and the water therein almost balance on opposite sides of said pivot axis yet leave a slight preponderance of weight on one side of said pivot axis sufficient to actuate said motion-transmitting mechanism to operate said valve, said fulcrum means including a main fulcrum element pivotally supporting one portion of said pan at a first location near the front of said pan, and an auxiliary fulcrum element spaced away from said main fulcrum element and pivotally supporting another portion of said pan at a second location spaced rearwardly from said first location, said pan having front, rear, side and bottom walls; a vertical plane through said pivot axis obliquely intersecting said rear wall at a location intermediate its junction with said side walls.

5. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, and motion-transmitting mechanism extending from a point on said pan spaced apart from said pivot axis to said valve member, said pan being do disposed relatively to said pivot axis that the weight of the pan and the water therein almost balance on opposite sides of said pivot axis yet leave a slight preponderance of weight on one side of said pivot axis sufficient to actuate said motion-transmitting mechanism to operate said valve, said fulcrum means including a main fulcrum element pivotally supporting one portion of said pan at a first location near the front of said pan, and an auxiliary fulcrum element spaced away from said main fulcrum element and pivotally supporting another portion of said pan along a rolling point of contact during tilting of said pan, said rolling point of contact being spaced rearwardly from said first location.

6. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, and motion-transmitting mechanism extending from a point on said pan spaced apart from said pivot axis to said valve member, said pan being so disposed relatively to said pivot axis that the weight of the pan and the water therein almost balance on opposite sides of said pivot axis yet leave a slight preponderance of weight on one side of said pivot axis sufficient to actuate said motion-transmitting mechanism to operate said valve, said fulcrum means including a main fulcrum element pivotally supporting one portion of said pan at a first location near the front of said pan, and an auxiliary fulcrum element spaced away from said main fulcrum element and pivotally supporting another portion of said pan at a second location spaced rearwardly from said first location, said pan having front, rear, side and bottom walls, said main fulcrum element pivotally engaging one of said side walls and said auxiliary fulcrum element pivotally engaging said bottom wall.

7. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, and motion-transmitting mechanism extending from a point on said pan spaced apart from said pivot axis to said valve member, said pan being so disposed relatively to said pivot axis that the weight of the pan and the water therein almost balance on opposite sides of said pivot axis yet leave a slight preponderance of weight on one side of said pivot axis sufficient to actuate said motion-transmitting mechanism to operate said valve, said fulcrum means including a main fulcrum element pivotally supporting one portion of said pan at a first location near the front of said pan, and an auxiliary fulcrum element spaced away from said main fulcrum element and pivotally supporting another portion of said pan at a second location spaced rearwardly from said first location, said pan having front, rear, side and bottom walls, said main fulcrum element pivotally engaging one of said side walls, said motion-transmitting mechanism being connected to the side wall opposite said one side wall, and said auxiliary fulcrum element pivotally engaging said bottom wall.

8. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, and motion-transmitting mechanism extending from a point on said pan spaced apart from said pivot axis to said valve member, said pan being so disposed relatively to said pivot axis that the weight of the pan and the water therein almost balance on opposite sides of said pivot axis yet leave a slight preponderance of weight on one side of said pivot axis sufficient to actuate said motion-transmitting mechanism to operate said valve, said fulcrum means having a main fulcrum element including a cross member mounted on said bracket structure transversely of said pan and extending through both side walls of said pan.

9. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, and motion-transmitting mechanism extending from a point on said pan spaced apart from said pivot axis to said valve member, said pan being so disposed relatively to said pivot axis that the weight of the pan and the water therein almost balance on opposite sides of said pivot axis yet leave a slight preponderance of weight on one side of said pivot axis sufficient to actuate said motion-transmitting mechanism to operate said valve, said fulcrum means having a main fulcrum element including a cross member mounted on said bracket structure transversely of said pan and extending through both side walls of said pan but pivotally engaging only one side wall thereof.

10. A balanced pan humidifier for a heater comprising an elongated evaporator pan, a mounting bracket structure adapted to be secured to the heater and having fulcrum means thereon tiltably supporting said pan along a pivot axis disposed generally lengthwise of said pan but obliquely to the longitudinal center line thereof, a water flow regulating valve connected to said bracket and having a movable flow-regulating valve member, motion-transmitting mechanism extending from a point on said pan spaced apart from said pivot axis to said valve member, said fulcrum means including a main fulcrum element pivotally supporting one portion of said pan at a first location near the front of said pan, and an auxiliary fulcrum element spaced away from said main fulcrum element and pivotally supporting another portion of said pan at a second location spaced rearwardly from said first location, said pan having front, rear, side and bottom walls; a vertical plane through said pivot axis obliquely intersecting said rear wall at a location intermediate its junction with said side walls, and a multiplicity of evaporator plates supportedly mounted in said pan in spaced substantially parallel relationship with the opposite ends thereof disposed on opposite sides of said vertical plane, said pan and said plates being so disposed relatively to said pivot axis that the weight of the pan and the water therein and the plates almost balance on opposite sides of said pivot axis yet leave a slight preponderance of weight on one side of said pivot axis sufficient to actuate said motion-transmitting mechanism to operate said valve.

11. A water level regulator for a humidifier pan for a heater comprising a mounting bracket structure adapted to be secured to the heater, a water flow regulating valve connected to said bracket and having a movable flow-regulating valve member, a valve lever fulcrum mounted on said bracket structure, a valve lever pivotally mounted on said fulcrum with one portion thereof operatively connected to said valve member, and water-level-sensing mechanism connected to another portion of said valve lever and responsive to the change of water level in the pan for shifting said valve level, said fulcrum being movably mounted on said bracket structure for adjustment relatively to said bracket structure and to said valve lever, said valve lever having multiple fulcrum engagement portions spaced apart from one another along said valve lever, said fulcrum being selectively engageable with said fulcrum engagement portions.

References Cited in the file of this patent

UNITED STATES PATENTS

| 153,000 | Kelly | July 14, 1874 |
| 1,602,047 | Schultheis | Oct. 5, 1926 |
| 1,669,568 | McGee | May 15, 1928 |
| 1,706,903 | Smith et al. | Mar. 26, 1929 |
| 1,720,241 | Sallada | July 9, 1929 |
| 2,573,158 | Muth et al. | Oct. 30, 1951 |
| 2,588,567 | Perlman | Mar. 11, 1952 |
| 2,709,429 | Perlman | May 31, 1955 |

FOREIGN PATENTS

| 742,454 | France | Dec. 27, 1932 |
| 628,844 | Germany | Apr. 17, 1936 |